United States Patent Office 3,443,851
Patented May 13, 1969

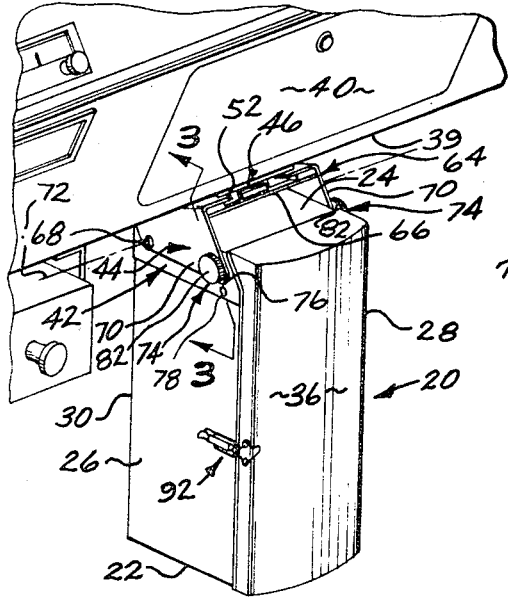
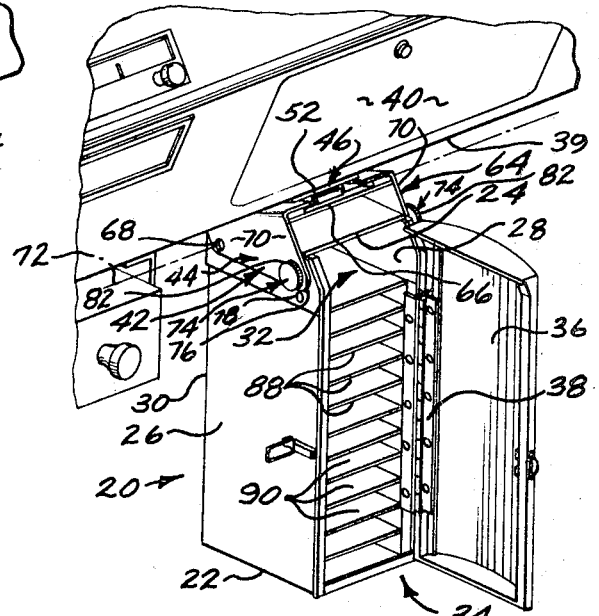
FIG. 1  FIG. 2
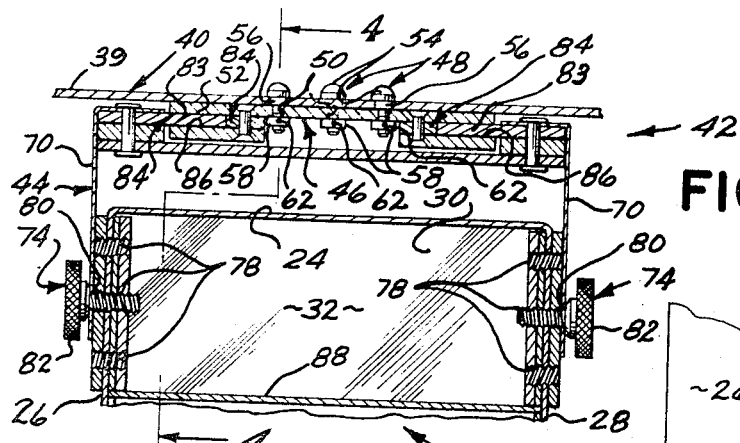
FIG. 3
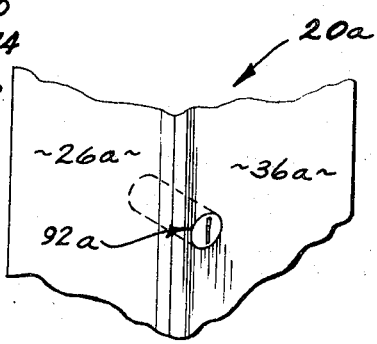
FIG. 7
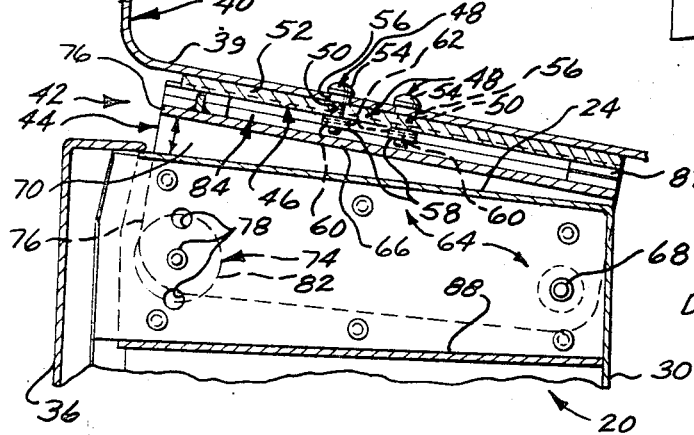
FIG. 4
INVENTOR.
DALLAS W. EARL

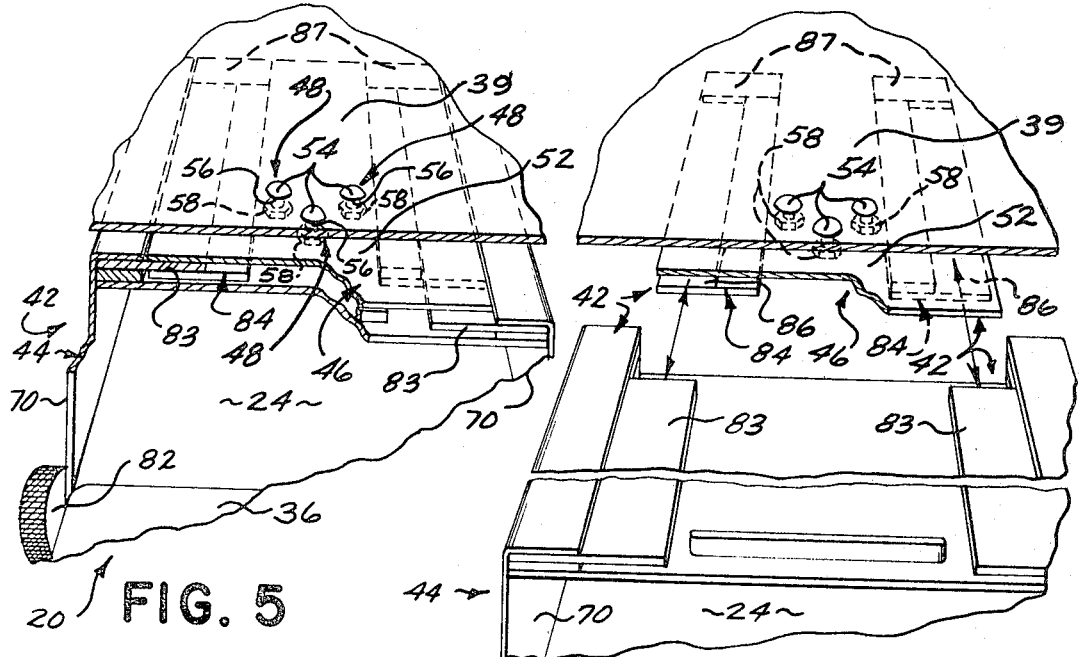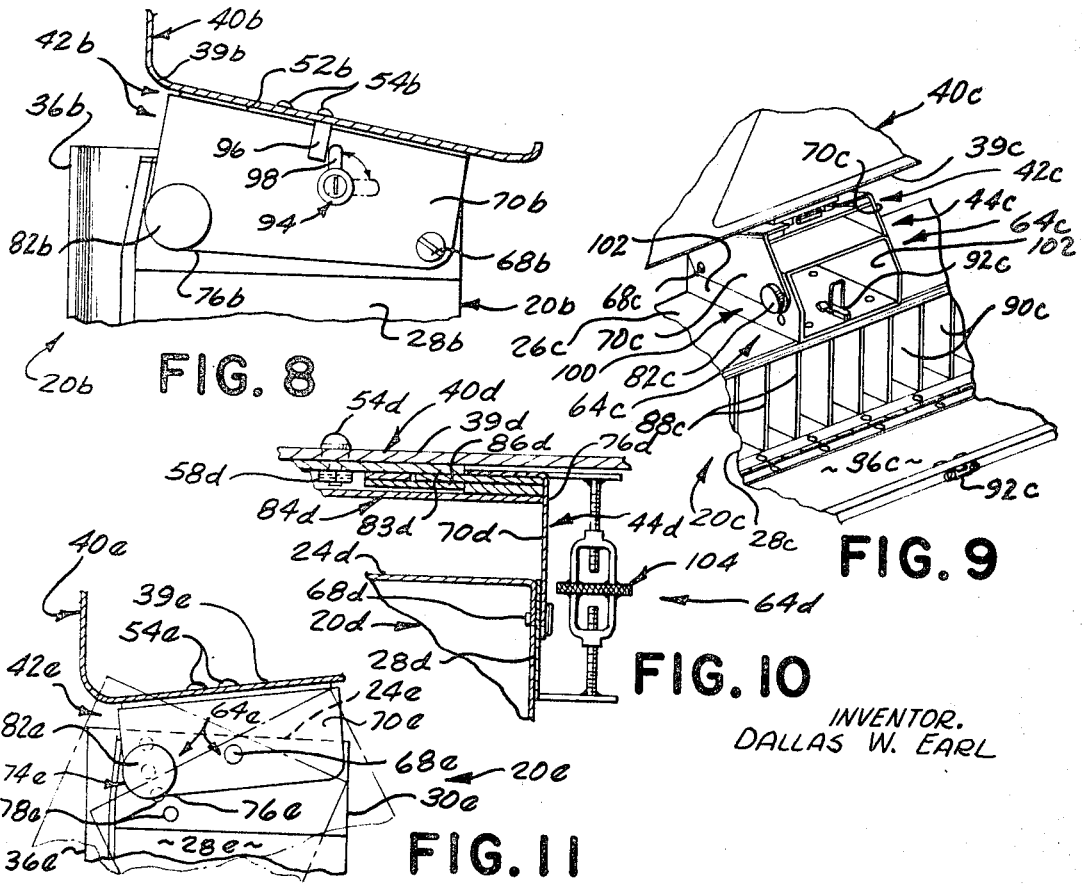

3,443,851
EASY-TO-MOUNT AND EASY-TO-DISMOUNT
STORAGE CONTAINER
Dallas W. Earl, 3216 La Clede Ave.,
Los Angeles, Calif. 90039
Filed Jan. 5, 1968, Ser. No. 695,906
Int. Cl. A47b 43/00; E05b 65/52
U.S. Cl. 312—245                                    12 Claims

ABSTRACT OF THE DISCLOSURE

The specification discloses a storage container (which, in one preferred form, may comprise a container for a plurality of magnetically recorded tapes or cartridges, such as stereophonic cartridges or the like,although not specifically so limited in all forms of the invention), with said storage container having a means for manually mounting and dismounting same without the use of tools underneath an auxiliary supporting surface, such as a bottom edge part of a motor vehicle dashboard or instrument panel in a preferred form of the invention, although the invention is not specifically so limited in all forms thereof. The mounting means is disclosed as being adapted to mount one longitudinal form of the storage container in a vertically directed and vertically elongated orientation underneath a motor vehicle dashboard or the like, or as being adapted to mount the storage container underneath a motor vehicle dashboard or the like in a horizontally elongated and directed orientation, although the invention is not specifically so limited in all forms thereof. The specification discloses the mounting means as being of a manually engageable and disengageable type which allows the storage container to be mounted under the motor vehicle dashboard or the like very quickly and easily and to be just as easily removed when desired and without requiring the use of any tools to perform either the mounting or dismounting operation after initial installation of one portion or element of the mounting means underneath the motor vehicle dashboard. This makes it possible for a person to carry a number of valuable stereophonic or monaural type recorded cartridges or tapes within the storage container and to remove them fom the motor vehicle when one arrives home and take them into the house for the night so that they can be played in a stereophonic or monaural tape playback unit within the house and also so as to prevent the possibility of theft of the valuable cartridges or tapes. The entire storage container carrying the cartridges or tapes can be just as quickly and easily remounted in the morning so that they will be available to be played by a playback unit in the motor vehicle during the day. The specification discloses one preferred form of the apparatus as being provided with locking means for locking the storage container against the normal easy removal thereof and for locking an access door into the storage container for the purpose of preventing theft of the entire storage container and/or individual cartridges or tapes therefrom. The mounting means is also disclosed as being provided with angular adjustment means adapted to compensate for the fact that the bottom edge of the dashboard or instrument panel of various different motor vehicles may be inclined at different angles and, thus, have different angular deviations from a true horizontal plane, which can be fully corrected and compensated for by the angular adjustment means so as to cause the depending underlying storage container to be positioned in a desired orientation (usually in a vertical plane).

Generally speaking, the apparatus of the present invention comprises a storage container having quick connect and disconnect mounting and dismounting means of an adjustable character which allows the storage container to be quickly mounted and dismounted with respect to an auxiliary supporting surface, such as the bottom edge of an automobile dashboard or the like, and also allows the angular positioning adjustment thereof into a desired position and orientation. The mounting means requires only a very simple initial installation of one portion or element thereof with respect to the auxiliary supporting surface (usually the bottom edge of a motor vehicle dashboard) which takes just a few moments, and, thereafter, the mounting and dismounting of the remainder of the apparatus, comprising the other element of the mounting means and the storage container depending therefrom, can be accomplished in a matter of seconds and can even be done with one hand if desired and does not require the use of any tools whatsoever.

The storage container, in a preferred form, has a front access door which, in certain forms, can be controllably locked and which is normally closed but which can be opened to provide access into an interior storage chamber therewithin which, in one preferred form, is divided into a plurality of interior storage chamber compartments by the provision of a plurality of spaced divider members which, in certain forms of the invention, may comprise vertically spaced, substantially horizontally directed shelf members and which, in other forms of the invention, may effectively comprise transversely spaced, substantially vertically directed divider members, with each of the storage chamber compartments being of generally similar size and shape suitable for the reception and temporary storage therein of corresponding stereophonic and/or monaural recorded (or recording) tapes or cartridges. Thus, it will be understood that a person driving the motor vehicle equipped with the storage container of the present invention can reach down with one hand, open the access door, remove a cartridge, and insert same into the playback unit without the necessity of using his other hand or of even diverting his eyes from the road.

Thus, while it may not be the ideal practice from a safety point of view, it is possible to accomplish the operation just described while continuing to drive the motor vehicle since so little attention is required to accomplish the operation just described. The removal of a cartridge from the playback unit and the placing of same in an appropriate storage compartment within the storage container can be just as easily accomplished with a minimum of effort and with the use of only one hand.

It will be understood that when one reaches a destination and does not intend to be in the motor vehicle for some time and when there is a possibility that one or more of the cartridges or tapes may be placed in a playback unit at the destination, such as when one reaches home at night, for example, the entire storage container can be dismounted in a matter of seconds and can be carried into the house and set up at any suitable location adjacent to a playback unit so that all of the stereophonic or monaural cartridges or tapes will be available for playback use. Subsequently, the following morning, or the next time the person intends to leave the house and be in his motor vehicle for a lengthy period of time, he may carry the entire storage container out to his motor vehicle and quickly remount it underneath the dashboard so that it will be available for use in the manner referred to above as long as he is in the motor vehicle.

Since the bottom edge of the dashboard or instrument panel of different motor vehicles has been found to frequently vary in angular inclination, ranging all the way from substantially horizontal to rather substantial angular deviations from a true horizontal plane, the mounting means of the present invention, in a preferred form thereof, is provided with angular adjustment means which allows the relative angular relationship between the mounting means and the storage container positioned therebelow to be adjusted until the storage container lies in a proper and desired orientation, which is usually a position such that the front access door and front opening normally covered thereby lie at the front of the storage container in a substantially vertically directed plane.

In a preferred form of the invention, the mounting means may be provided with a lock for immobilizing it to prevent the entire storage container from being stolen, and the front access door may be similarly provided with a lock to prevent the opening of the door by unauthorized persons. Both of these features are for the purpose of preventing theft of the relatively valuable stereophonic or monaural cartridges and/or tapes from the motor vehicle during periods when the motor vehicle is stopped and the driver may be temporarily out of the motor vehicle for a short period of time and, thus, has not removed the storage container in the manner referred to above. During such temporary absences from the motor vehicle which may occur during the course of calling on customers or other similar situations, it is often the case that a person may not even lock the doors of the motor vehicle or, if he does, it may be of the convertible type having a fabric top which can be easily slashed to allow the insertion of a hand therethrough and the unlocking of the door so that the would-be thief can easily enter the motor vehicle. Normally, it would be a matter of only a few moments for the thief to remove the entire storage container and all of the valuable sterephonic and/or monaural cartridges or tapes contained therein. However, the novel locking means of the present invention referred to above will positively prevent this.

With the above points in mind, it is an object of the present invention to provide a novel, easy-to-mount and easy-to-dismount storage container which, in a preferred form, may be intended to receive and store sound recording cartridges or tapes, although not specifically so limited, and which can be quickly mounted underneath an automobile dashboard or instrument panel, although not specifically so limited in all forms of the invention, and which can be just as quickly and easily dismounted therefrom and completely removed when desired, and which, furthermore, in one preferred form, can be positionally adjusted whereby to properly position the storage container with respect to the automobile dashboard or other auxiliary surface temporarily supporting and carrying same.

It is a further object of the present invention to provide apparatus of the character set forth in the preceding object having means for locking the device so that it cannot be dismounted until unlocked and/or having means for locking an access door so that it cannot be opened until unlocked. It is a further object of the present invention to provide a novel storage container and mounting means of the character referred to herein, having any or all of the advantages referred to herein, and including any or all of the features referred to herein, generically and/or specifically, and individually or in combination and which is of relatively simple, inexpensive, easily mountable and dismountable construction which can be manufactured with a minimum of tooling costs and also production per unit costs, and which is generally adaptable for mounting use with virtually all types of motor vehicles and even other auxiliary supporting surfaces, and which, while primarily intended for storing monaural or stereophonic recording cartridges or tapes, can be employed for storing a variety of different types of objects, whereby to be conductive to widespread manufacture, sale, and use of the invention for the purposes outlined herein or for other substantially functionally equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary embodiments of the invention are illustrated in the hereinbelow-described figures of the accompanying drawings and are described in detail hereinafter.

FIG. 1 is a reduced-size, fragmentary, perspective view illustrating one exemplary embodiment of the present invention shown in mounted relationship underneath a portion of an automobile dashboard or instrument panel which, in this case, comprises a specific and particular type of the hereinbefore generally referred to auxiliary supporting surface. In this view, the access door is shown closed.

FIG. 2 is a view very similar to FIG. 1 but shows the device with the access door in open position for allowing the removal from the storage container or the insertion into the storage container of a stereophonic or monaural cartridge or tape.

FIG. 3 is a fragmentary sectional view through the storage container and the mounting means at the top thereof, taken substantially along the multiple planes indicated by the arrows 3—3 of FIG. 1, and illustrates the slidably engageable and disengageable nature of the two mating engagement portions of the mounting means. This view also shows the attachment of the upper one of the two mating engagement portions of the mounting means in installed relationship with respect to the bottom portion of the motor vehicle dashboard or instrument panel.

FIG. 4 is a fragmentary sectional view taken substantially in the direction of the arrows 4—4 of FIG. 3 and illustrates a representative one of the two identical although positionally reversed portions of the angular adjustment means of the exemplary first form of the invention in one particular representative one of the plurality of angular adjustment positions capable of being assumed thereby.

FIG. 5 is a fragmentary, partially broken away, perspective view showing the mounting means and a very small fragment of the motor vehicle dashboard attached to the upper portion of the mounting means with the mounting means being in the fully engaged position corresponding to that shown in FIGS. 1–4.

FIG. 6 is a fragmentary view similar to FIG. 5, but illustrates the dismounting of the storage container and the lower portion of the mounting means by showing the apparatus immediately after completion of a dismounting operation, which is the same position as that immediately before the beginning of a mounting operation.

FIG. 7 illustrates fragmentarily a slight modification of the storage container wherein the front access door and the cooperating edge of the cabinet are provided with cooperating portions of a key-operated lock which makes it possible to lock or unlock the access door.

FIG. 8 is a fragmentary view of a slightly modified form of the invention as it would appear viewed from the right side thereof and illustrating the provision of an additional locking means for locking the mounting means so that the type of slidable disengagement relative movement of the upper and lower portions of the mounting means illustrated in FIG. 6 cannot be accomplished until the lock is unlocked.

FIG. 9 is a fragmentary, partially broken away, perspective view similar in many respects to FIG. 2, but merely illustrates an alternative arrangement wherein the cabinet is mounted at right angles to the position shown in FIG. 1.

FIG. 10 is a fragmentary view somewhat similar to a fragmentary showing of the upper right hand corner portion of FIG. 3 and illustrating a slight modification of the angular adjustment means.

FIG. 11 is a fragmentary view similar in certain respects to FIG. 4 of the first form of the invention or to FIG. 8 of the second modification of the invention, but illustrates a modified type of angular adjustment means capable of compensating for the angular inclination of an underneath portion of a motor vehicle dashboard which is inclined in the opposite direction from that of the earlier forms of the invention, in addition to being capable of functioning in the manner of the angular adjustment means of the earlier forms of the invention. In other words, this modification discloses one representative type of more universally adaptable angular adjustment means.

Generally speaking, the exemplary first form of the invention illustrated in FIGS. 1–6 comprises a storage container means indicated generally at 20 which is shown as taking the form of a cabinet having a pair of longitudinally spaced end walls 22 and 24 and a pair of spaced walls 26 and 28 spaced apart in a direction transverse to the longitudinal spacing of the pair of end walls 22 and 24 and a rear wall 30, connected to rear edges of all four of said peripheral walls 22, 24, 26, and 28 so as to effectively define within the cabinet 20 an interior chamber indicated generally at 32, which has a front opening 34 (best shown in FIG. 2) which is provided with a controllably openable and closable access door 36 mounted by hinge means 38 for movement between a closed position as shown in FIG. 1 and an open position as shown in FIG. 2.

It should be noted that in the invention as illustrated in FIGS. 1–6 and in the exemplary mode of removable mounting of the storage container 20 with respect to an auxiliary supporting surface taking the form of a bottom edge part 39 of a motor vehicle dashboard such as is indicated fragmentarily at 40, the hereinabove-described pair of end walls 22 and 24 may be said, by reason of vertical orientation, to effectively comprise a bottom end wall 22 and a top end wall 24 vertically spaced apart, and the pair of previously described transversely spaced walls 26 and 28 may be said, by reason of vertical orientation of the device, to comprise a pair of laterally spaced side walls 26 and 28. However, the words "top," "bottom," and "side" as used in this connection are applicable only because of the particular orientation of the storage container 20 in the arrangement illustrated in FIGS. 1–6. and when the storage container is mounted at right angles to the mounting shown in FIGS. 1–6 in the manner illustrated fragmentarily in FIG. 9, as will be described in greater detail hereinafter, said words must then be interpreted broadly since the top and bottom end walls 22 and 24 become, in effect, side walls and since the pair of transversely spaced side walls 26 and 28 become, in effect, top and bottom walls. Thus, said terminology is to be interpreted broadly in the light of the foregoing statements.

In the exemplary first form of the invention illustrated, the cabinet 20 is provided at the top thereof, immediately above the uppermost wall thereof which, in the first form of the invention shown in FIGS. 1–6 comprises the top end wall 24 thereof, with manually engageable and disengageable mating engagement means, indicated generally at 42, which includes a first engagement element 44 which is effectively attached with respect to the top of the cabinet 20 and a second engagement element or portion 46 which is provided with attachment means 48 for attaching same underneath a corresponding portion of an auxiliary supporting surface which, in this case, comprises the previously mentioned bottom edge part 39 of the previously mentioned motor vehicle dashboard indicated generally at 40.

In the exemplary first form illustrated, the attachment means 48 comprises a plurality of holes 50 in a plate 52 and threaded fastener means, such as bolts or screws 54, adapted to extend through the holes 50 and corresponding holes 56 which have been drilled through the bottom edge part 39 of the motor vehicle dashboard 40 and to engage interiorly threaded nuts 58 after having passed through the aligned holes 50 and 56 so that the bolts and nuts 54 and 58 can be firmly tightened together to lock the plate 52 in rigidly mounted relationship underneath the bottom edge part 39 of the motor vehicle dashboard 40.

Incidentally, it should be noted that, if desired, after mounting the plate 52 underneath the bottom edge part 39 of the motor vehicle dashboard 40 in the manner just described, it may be locked so as to prevent unauthorized removal thereof, and this may be accomplished in any of several different manners. One way of effectively providing this is to provide holes transversely through the engaged bolts 54 and nuts 58 and to drive locking pins transversely therethrough. One such arrangement is illustrated fragmentarily in FIG. 3. However, various other types of locking means for locking the plate 52 so that it cannot be easily removed from the dashboard bottom edge part 39 may be employed in lieu thereof, or this optional feature may be eliminated entirely in certain forms of the invention where the locking feature is not desired. As shown in FIG. 3, the aligned holes are indicated by the reference numeral 60, and the locking pin is indicated by the reference numeral 62.

In the exemplary first form of the invention illustrated, the first engagement element 44 is attached to the top of the cabinet 20 by angular adjustment means indicated generally at 64 and said first engagement element 44 and the angular adjustment means 64 comprise and include a plate 66 having one end portion, in the first form of the invention illustrated a rear end portion thereof, pivotally attached by effective pivot pin means 68 (in the example illustrated comprising two such pivot pins 68 at each side of the upper side walls 26 and 28 of the cabinet 20) which extend through corresponding parallel downwardly directed flange portions 70 so that it can be said that the entire first engagement element 44 is effectively angularly pivotally mounted for movement around a lateral axis 72 coincident with said pivot means 68 so that a front portion 76 of the plate 66 which is forwardly offset from the pivotally attached rear portion thereof can move upwardly or downwardly in the manner best illustrated in FIG. 4.

In the example illustrated, the angular adjustment means 64 includes means, indicated generally at 74, which is operable for freeing the front or offset freely movable portion 76 of the plate 66 for the arcuate swinging movement described above around the lateral pivot axis 72 but also operable for controllably locking same in any selected arcuately adjusted position.

In the exemplary first form of the invention illustrated, said means 74 just referred to above takes the form of a plurality of transverse apertures 78 vertically arcuately spaced and carried in the upper parts of the pair of spaced side walls 26 and 28 of the cabinet 20 which are interiorly threaded or tapped, and corresponding individual apertures 80 carried in the forward arcuately movable parts of the flange 70 threadedly carrying a corresponding pair of locking thumb screw means 82.

It will be understood that by unthreading the thumb screw means 82 until the inner ends thereof do not extend into any of the inner apertures 78, it will be found that the forward offset portion 76 of the plate 66 has been freed for the above-mentioned type of vertical arcuate swinging or adjustment movement relative to the rest of the depending cabinet 20 and that as soon as a desired pair of the plurality of pairs of inner apertures 78 is aligned with the outer apertures 80 and the lower portion of the cabinet 20 is in a proper vertical orientation, the thumb screw means 82 may be threadedly inwardly advanced through the aligned apertures 80 and 78 on each side of the device, respectively, until the entire arcuately movable offset portion 76 of the plate 66 will be effectively locked in the selected arcuately adjusted position. In other words, this has the effect of locking the complete angular adjustment means, generally designated at 64, in the selected, angularly adjusted position which is normally so selected as to substantially compensate for any angular deviation of the dashboard bottom edge part 39 from a true horizontal plane in a manner such that the lower portion of the cabinet 20 will be substantially vertically directed.

In the exemplary first form of the invention, the previously mentioned mating engagement means 42 may take one particular form wherein they may be said to comprise tongue-in-groove track and track follower means adapted to be mounted so that the plane of sliding engagement and disengagement of the first and second engagement means elements 44 and 46 is inclined downwardly and forwardly in the direction of engaging movement of the first engagement element 44 and upwardly and rearwardly in the direction of disengaging movement thereof. This has the effect of causing disengaging movement of the engagement means 42 and the cabinet 20 to have an upward component against the force of gravity exerted thereupon, and, thus, normally, gravity tends to maintain full engagement of the first engagement element 44 with respect to the second engagement element 46, and there is no tendency of the two engagement elements to become inadvertently or accidentally disengaged as a result of a combination of vibration and gravity acting thereupon.

In the exemplary first form of the invention illustrated, the above-mentioned tongue-in-groove track and track follower means comprising the engagement means indicated generally at 42 comprises an inwardly directed pair of transversely spaced track follower members 83, each of which may be said to comprise an inwardly directed longitudinal tongue, also designated by the reference numeral 83, and said second engagement means element may be said to comprise a pair of similarly spaced outwardly directed track members, each in the form of an outwardly directed structure 84 defining a longitudinal groove 86 which relatively slidably receives a corresponding pair of inwardly directed tongues 83 therein for relative slidable movement along the lengths thereof.

The arrangement of the tongues 83 and grooves 86 is such that it is only necessary to engage the rear ends of the tongues 83 with the forward openings of the corresponding grooves 86 and to then rearwardly move the entire cabinet 20 to effect complete engagement of the engagement means indicated generally at 42 so that the cabinet 20 will be fully mounted underneath the dashboard bottom edge part 39 in the manner shown in FIGS. 1–5. This is done when the container 20 has been removed from the motor vehicle and is being returned for remounting therein.

When the dismounting operation is to be performed, it is only necessary to reverse the above-described mounting operation, and it will be found that the tongues 83 can be slidably moved forwardly or outwardly out of engagement with the corresponding grooves 86 in a manner shown in the process of accomplishment in FIG. 6, and this will bring about complete disengagement of the first engagement element 44 from the second engagement element 46 and the complete detachment of the cabinet 20 from its normal mounted position. The previously described engagement of the engagement means by sliding the tongues 83 into the ends of the grooves 86 and continuing the sliding engaging relative movement thereof may be effectively stopped at the appropriate fully engaged relationship thereof by any suitable type of stop means. In the example illustrated, said stop means is shown as comprising a pair of stop projections 87 carried by the bottom surface of the plate 52 of the second engagement element 46 at the rear ends of each of the two grooves 86 and so positioned as to abut the corresponding ends of the tongues 83 when a fully engaged relationship of the engagement means 42 is achieved. However, various substantially functionally equivalent arrangements may be employed in lieu thereof.

In the exemplary first form of the invention illustrated, the interior storage chamber 32 of the cabinet 20 is provided with a plurality of vertically spaced and substantially horizontally directed shelf members 88 which vertically divide the interior storage chamber 32 into a plurality of vertically adjacent but separate and discrete interior storage chamber compartments 90, each of which, in a preferred form, is of a similar size and shape suitable for the reception and storage of a conventional stereophonic or monaural tape reel or cartridge (not shown since such are well known in the art).

Also, in the exemplary first form of the invention illustrated, the access door 36 and the cabinet side wall 26 are provided with an effective door latch or lock, such as indicated generally at 92, which is shown as being of a type which is manually operable and which normally holds the door in closed, latched relationship but which allows it to be very quickly and easily opened. However, in some forms of the invention, it may be desirable for the door latch or lock 92 to be of a positive locking type, and such an arrangement is illustrated in FIG. 7 wherein the door lock 92a is shown as being of a key-operable type, although it may be of a combination lock type or any other suitable type, which is adapted for controllable locking cooperation with respect to the access door 36a and cabinet side wall 26a so that the door 36a can be positively locked in closed position in a manner similar to the showing of FIG. 1 or controllably unlocked and opened in a manner similar to the showing of FIG. 2 of the first form of the invention. In this modification, parts which are similar to those of the first form of the invention are designated by similar reference numerals, followed by the letter a, however.

It may also be desirable to positively lock the complete mounting means or engagement means, such as that generally designated by the reference numeral 42 in the first form of the invention, so that the complete cabinet or container will be locked against unauthorized removal, and such an arrangement is illustrated fragmentarily in FIG. 8 wherein similar parts are designated by similar reference numerals, followed by the letter b, however.

In the FIG. 8 modification, it will be noted that a rotary lock, indicated generally at 94, is carried by the side wall of the flange 70b and that a locking projection member 96 extends downwardly from the plate 52b into a position adjacent to said lock 94 and will be unable to relatively pass same when the catch element 98 of the lock 94 is rotated into and locked in a projecting position. However, when the lock 94 is unlocked and the catch element 98 is rotated into an unlocked position, the projection member 96 of the plate 52b is out of alignment with the lock catch element 98 and allows the slidable disengagement of the mating engagement means 42b.

FIG. 9 merely illustrates an alternate mounting arrangement for the basic structure of the first form of the invention shown in FIGS. 1–6. However, similar reference numerals, followed by the letter c, however, are employed to designate similar parts.

In the FIG. 9 modification, it will be noted that the entire first engagement element 44c and the entire angular adjustment means 64c are now carried by the laterally spaced wall 26c of the cabinet 20c which previously comprised the so-called left side wall 26 of the cabinet 22 of the first form of the invention shown in FIGS. 1–6. The only real difference of this modification of the invention with respect to the operation of said structures 42c and 64c is the fact that there is an upstanding bracket member 100 fastened to the cabinet wall 26c and having a pair of upwardly directed laterally spaced flanges 102 to which the downwardly directed flanges 70c are effectively pivotally connected in a manner similar to the previously described pivotal connection of the corresponding downwardly directed flange 70 of the first form of the invention with respect to the top parts of the upstanding side walls 26 and 28 of the cabinet 20 of the first form of the invention. In other words, in this modification, the upstanding flanges 102 functionally correspond to the upper parts of the container side walls 26 and 28 of the first form of the invention, and the rest of the bracket 100 merely comprises a means for effectively connecting same to the now laterally directed container wall 26c. Otherwise, this modification of the invention functions substantially the same as the first form of the invention with the exception of the fact that all of the storage chamber compartments 90c are now vertically directed and horizontally adjacent to each other and are primarily intended to receive and store stereophonic or monaural recording tapes or cartridges on their edges rather than on their flat surfaces.

FIG. 10 fragmentarily illustrates a very slight modification of the angular adjustment means indicated at 64 in the first form of the invention, and in this modification similar parts are designated by similar reference numerals, followed by the letter d, however. The angular adjustment means 64d in this modification, comprises a threaded extension and retraction type actuator means 104 effectively connected between the forward arcuately movable free end 76d of the plate 66d, and a corresponding underlying portion of the top wall 24d of the cabinet 20d, and adapted to become extended when rotated in one direction and to become retracted when rotated in the other direction, thus causing a desired extent of angular repositioning adjustment for the general purposes previously described in detail.

FIG. 11 fragmentarily illustrates a further slight modification of the angular adjustment means indicated at 64 in the first form of the invention, and in this modification similar parts are designated by similar reference numerals, followed by the letter e, however. The angular adjustment means 64e, in this modification, comprises the same type of alignable multiple apertures 78e and apertures similar to those shown at 80 of the first form of the invention but not shown in FIG. 11, and thumb screw means 82e, all similar to the corresponding parts of the first form of the invention shown at 78, 80, and 82, respectively, and all generally designated by the reference numeral 74 in the first form of the invention and generally designated by the reference numeral 74e in the FIG. 11 modification of the invention. In other words, this portion of the FIG. 11 modification is substantially the same as that disclosed in the first form of the invention and previously described in detail.

However, the major change of this modification from the first form of the invention lies in the forward repositioning of the pair of effective pivot pin means shown at 68 in the first form of the invention to a location substantially halfway between the front and rear ends of the pair of flanges 70e of the FIG. 11 modification of the invention as indicated at 68e with respect to one of the two similar pivot pin means of this modification. It is apparent that this provides for angular adjustment movement in either of two directions as shown in phantom in FIG. 11 and thus makes possible the adjustment of the angular adjustment means so as to vertically orient the container means 20e even when the underneath or bottom surface portion 39e of the dashboard shown fragmentarily at 40e is inclined in the opposite direction from the dashboard bottom surface portion 39 of the first form of the invention. Also, it should be understood that this modified angular adjustment means 64e is capable of being adjusted for a horizontal dashboard bottom mounting surface 39e or one inclined in the general manner of that disclosed in the earlier forms of the invention and, thus, is a more universally adaptable and adjustable type of angular adjustment means than that disclosed in the earlier forms of the invention.

It should be understood that the specific type of angular adjustment means illustrated in any of the various forms of the invention is exemplarly and is not intended to specifically limit the invention to the exact structural details thereof, but rather to the broad inventive concept of such an angular adjustment means functional for the purposes of the present invention as taught herein.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A storage container having means for manually mounting and dismounting same without the use of tools underneath an auxiliary supporting surface, comprising: a storage container means taking the form of a cabinet, said cabinet defining an interior storage chamber having a front opening thereinto and provided with a controllably openable and closable access door positioned across said front opening and closing same when moved into closed position with respect thereto, said cabinet being provided at the top thereof with manually engageable and disengageable mating engagement means including a first engagement element effectively attached with respect to said cabinet and a second engagement element provided with attachment means for attaching same to a corresponding portion of an auxiliary supporting surface, said first and second engagement elements of said mating engagement means comprising track follower means and track means slidably engageable with respect to each other and slidably disengageable with respect to each other, said first engagement element effectively connected to said cabinet at the top thereof being provided with angular adjustment means effectively positioned therebetween and capable of permitting relative angular adjustment of the cabinet with respect to the engagement means and, therefore, with respect to an auxiliary supporting surface to which the second engagement element is adapted to be attached, for the purpose of achieving a substantially vertical position of said cabinet irrespective of angular deviation from a true horizontal plane of an auxiliary supporting surface to which said second engagement element is adapted to be attached.

2. Apparatus as defined in claim 1, wherein said mating engagement means is mounted so that the plane of sliding engagement and disengagement thereof is inclined downwardly in the direction of engaging movement of said first engagement element connected to the cabinet so that relative movement of said mating engagement means into fully engaged relationship will be in a direction such as to have a directional component similar to the force of gravity exerted thereupon by the depending cabinet, thus tending to prevent inadvertent and accidental disengagement of said mating engagement means.

3. Apparatus as defined in claim 1, wherein said first engagement element comprises an inwardly directed pair of transversely spaced track follower members in the form of inwardly directed longitudinal tongues and wherein said second engagement element comprises a pair of similarly spaced outwardly directed track members, each in the form of an outwardly directed structure defining a longitudinal groove relatively slidably receiving the pair of inwardly directed tongues comprising said track follower member for relative slidable movement along the lengths thereof.

4. Apparatus as defined in claim 1, wherein said angular adjustment means comprises a plate having one portion effectively pivotally attached with respect to an upper portion of said cabinet for relative pivotal movement around a lateral axis and having a portion of said plate offset from the pivotally attached portion thereof provided with means for allowing arcuate angular-position-adjusting movement around the pivotal attachment point and for controllably locking same in any selected arcuately adjusted position.

5. Apparatus as defined in claim 4, wherein said first engagement element comprises an inwardly directed pair of transversely spaced track follower members in the form of inwardly directed longitudinal tongues and wherein said second engagement element comprises a pair of similarly spaced outwardly directed track members, each in the form of an outwardly directed structure defining a longitudinal groove relatively slidably receiving the pair of inwardly directed tongues comprising said track follower members for relative slidable movement along the lengths thereof.

6. Apparatus as defined in claim 5, wherein said means for allowing angular-position-adjusting movement of the angular adjustment means and for controllably locking same in any selected arcuately adjusted position comprises alignable aperture means and locking screw means cooperable therewith in any of various arcuately adjusted relative positions thereof.

7. Apparatus as defined in claim 4, wherein said means for allowing angular-position-adjusting movement of the angular adjustment means and for controllably locking same in any selected arcuately adjusted position comprises alignable aperture means and locking screw means cooperable therewith in any of various arcuately adjusted relative positions thereof.

8. Apparatus as defined in claim 1, including theft-preventing engagement means, locking means including catch means controllably operable into a theft-preventing position such as to prevent slidable engagement and disengagament of said engagement means and controllably operable into an unlocked position allowing free relative engaging and disengaging movement of said engagement means.

9. Apparatus as defined in claim 1, including a door lock mounted for controllable locking cooperation with respect to said door and a corresponding portion of the remainder of said cabinet for controllably locking said door in closed relationship across said front opening and for controllably unlocking same to allow the opening of said door.

10. Apparatus as defined in claim 8, including a door lock mounted for controllable locking cooperation with respect to said door and a corresponding portion of the remainder of said cabinet for controllably locking said door in closed relationship across said front opening and for controllably unlocking same to allow the opening of said door.

11. Apparatus as defined in claim 5, wherein said means for allowing angular-position-adjusting movement of the angular adjustment means and for controllably locking same in any selected arcuately adjusted position comprises threaded extension and retraction type actuator means effectively connected between said end of said plate and a corresponding underlying portion of said cabinet.

12. Apparatus as defined in claim 1, wherein said cabinet is provided with a plurality of longitudinally spaced, substantially transversely directed divider members effectively dividing said interior storage chamber into a plurality of longitudinally adjacent but separate and discrete interior storage chamber compartments.

References Cited

UNITED STATES PATENTS

| | | | |
|---|---|---|---|
| 2,749,202 | 6/1956 | Ritzerfeld et al. | 312—327 |
| 3,146,739 | 9/1964 | Furman | 312—245 X |
| 3,371,976 | 3/1968 | Ritz | 312—245 |
| 3,387,904 | 7/1968 | Beha | 312—245 |

CASMIR A. NUNBERG, *Primary Examiner.*

U.S. Cl. X.R.

312—248